(12) United States Patent
Yoshizawa (10) Patent No.: US 7,900,263 B2
(45) Date of Patent: Mar. 1, 2011

(54) CONTENT RECORDING/REPRODUCING APPARATUS AND CONTENT RECORDING/REPRODUCING METHOD

(75) Inventor: Junichi Yoshizawa, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 21 days.

(21) Appl. No.: 12/421,502

(22) Filed: Apr. 9, 2009

(65) Prior Publication Data
US 2009/0327710 A1 Dec. 31, 2009

(30) Foreign Application Priority Data

Jun. 30, 2008 (JP) .............................. 2008-170431

(51) Int. Cl.
| | |
|---|---|
| G06F 7/04 | (2006.01) |
| G06F 17/30 | (2006.01) |
| G06F 11/30 | (2006.01) |
| G06F 12/14 | (2006.01) |
| G06F 9/44 | (2006.01) |
| H04N 7/16 | (2006.01) |
| H04N 7/167 | (2006.01) |
| H04N 7/18 | (2006.01) |
| H04L 29/06 | (2006.01) |
| H04L 9/32 | (2006.01) |
| B41K 3/38 | (2006.01) |
| H04K 1/00 | (2006.01) |

(52) U.S. Cl. ............................... 726/26; 726/2; 713/153; 713/168; 713/193; 380/59; 380/201; 380/255; 725/25; 725/74; 717/168

(58) Field of Classification Search ........................ None
See application file for complete search history.

(56) References Cited

U.S. PATENT DOCUMENTS

| | | | | |
|---|---|---|---|---|
| 6,034,832 A | * | 3/2000 | Ichimura et al. | 360/60 |
| 6,615,192 B1 | * | 9/2003 | Tagawa et al. | 705/57 |
| 7,152,166 B2 | * | 12/2006 | Strom et al. | 713/193 |
| 7,685,646 B1 | * | 3/2010 | Hug et al. | 726/30 |

(Continued)

FOREIGN PATENT DOCUMENTS

JP 2002-190795 A 7/2002

(Continued)

OTHER PUBLICATIONS

Explanation of Non-English Language Reference(s).

(Continued)

*Primary Examiner* — Nasser Moazzami
*Assistant Examiner* — Oscar A Louie
(74) *Attorney, Agent, or Firm* — Knobbe, Martens Olson & Bear LLP (57) ABSTRACT

According to one embodiment, a content recording apparatus is connected with a permission server that permits recording of content through a network. The content recording apparatus reads content encrypted based on a first encryption scheme and binding information from a disposed second recording medium, and uses the binding information to decode the read content encrypted based on the first encryption scheme. The content recording apparatus uses the permission server to authenticate permission of recording of the content, encrypts the decoded content based on a second encryption scheme when recording of the content is permitted, and records the content encrypted based on the second encryption scheme and the binding information in the first recording medium.

1 Claim, 9 Drawing Sheets

U.S. PATENT DOCUMENTS

| | | | |
|---|---|---|---|
| 2004/0003267 A1* | 1/2004 | Strom et al. | 713/193 |
| 2005/0111663 A1* | 5/2005 | Lotspiech et al. | 380/239 |
| 2006/0067529 A1* | 3/2006 | Kojima | 380/201 |
| 2006/0112284 A1* | 5/2006 | Kato et al. | 713/193 |
| 2006/0227975 A1* | 10/2006 | Ueda et al. | 380/281 |
| 2006/0253910 A1* | 11/2006 | Yamamichi et al. | 726/31 |
| 2007/0220021 A1 | 9/2007 | Kato et al. | |

FOREIGN PATENT DOCUMENTS

| | | |
|---|---|---|
| JP | 2007-109080 | 4/2007 |
| JP | 2008-021350 A | 1/2008 |
| JP | 2008-084445 | 4/2008 |
| JP | 2008-098765 | 4/2008 |

OTHER PUBLICATIONS

English Translation of Notification of reasons for refusal mailed by the Japan Patent Office for Japanese Patent Application No. 2008-170431 on Oct. 27, 2009.

Notice of Reasons for Rejection issued by Japan Patent Office on Jun. 9, 2009 for corresponding Japanese Patent Application No. 2008-170431.

* cited by examiner

| Binding type | Binding target | Binding information to be utilized |
|---|---|---|
| Binding to Medium | Medium | VolumeID, PMSN |
| Binding to Content | Content | VolumeID |
| Binding to Medium & Device | Medium & Device | VolumeID, PMSN DUN |
| Binding to Content & Device | Content & Device | VolumeID, DUN |
| Binding to TN | TN | TN |

```
 ..
 //Download data from server
 HTTPClient.send(method=GET, destURL="http:/foo.org/cotent1/, srcURL="/data/cotent1);
 ..
 //Activate downloaded Playlist
 Playlist.load(destURL/*.XPL);
 ..
```

| Making reference to copy source | /mnt/ROM1/Provider1/Content1/data | | |
|---|---|---|---|
| Making reference to copy destination | /mnt/ROM2/Provider1/Content1/data | | |
| Detail of copy source data | File name | Date | Size |
| | Image1.jpg | 2008/2/19 | 156KB |
| | Bookmark.txt | 2007/12/25 | 3KB |
| | Intro.mpg | 20067/12/25 | 512KB |

FIG. 10

Content additional information

CONTENT RECORDING/REPRODUCING APPARATUS AND CONTENT RECORDING/REPRODUCING METHOD

CROSS-REFERENCE TO RELATED APPLICATIONS

This application is based upon and claims the benefit of priority from Japanese Patent Application No. 2008-170431, filed Jun. 30, 2008, the entire contents of which are incorporated herein by reference.

BACKGROUND

1. Field

One embodiment of the invention relates to a content recording/reproducing apparatus and a content recording/reproducing method that record content, e.g., a moving image in a recording medium.

2. Description of the Related Art

Various kinds of digital equipments that access content recorded in, e.g., an optical disk have been recently developed. Data recorded in the optical disk that is accessed by such equipments is subjected to encryption processing to avoid unauthorized access or illegal copy. In regard to this encrypted data, an encryption scheme conforming to a CSS (Contentscramble System) scheme is mainly adopted for a DVD (Digital Versatile Disc).

On the other hand, as a more sophisticated encryption scheme, an AACS (Advanced Access Contentsystem) is used for an HD-DVD or a BD (Bluelay-Disc). A content copy technology called "MC" (managed copy) is defined in this AACS standard.

For example, Japanese Patent Application Publication (KOKAI) No. 2008-21350 describes a content recording apparatus having this managed copy function. That is, the content recording apparatus adopting the AACS scheme requests a copy permission server to permit copy when copying content recorded in an optical disk. The content recording apparatus receives a content certificate from the copy permission server when authentication is performed by the copy permission server. The content recording apparatus uses binding information recorded in the optical disk to decode the content in the optical disk encrypted based on the AACS. The content recording apparatus records the decoded content in a recording medium as a recording target.

In the content recording apparatus, data as a managed copy target is not restricted to content recorded in, e.g., the optical disk. For example, the content recording apparatus can copy, e.g., content additional information stored in an equipment together with content data.

The content additional information is information utilized for reproduction of content. The content additional information is, e.g., pictures, sounds, still image data, or script data. The content additional information is read to be recorded when the content recording apparatus reads the content from the optical disk.

As a result, a user can see and listen to content copied based on the managed copy (copied content) in the same audio-visual environment as that for reading the content from the optical disk even when seeing and listening to the copied content.

Further, the above-explained content in the optical disk may have a network access function. In this case, the content recording apparatus can obtain network content through a network under control of an application for the content in the optical disk. The network content are, e.g., data such as a trailer put at the top of a movie. The content recording apparatus can combine the obtained network content with the content in the optical disk to be played back.

The network content are often encrypted based on the AACS for protection. However, copied content subjected to the managed copy by the content recording apparatus described in the Publication No. 2008-21350 do not have binding information. Therefore, the content recording apparatus cannot decode the network content obtained by accessing the network under control of the application for the copied content. As a result, a user may not possibly obtain the same audio-visual environment as that for reading the content from the optical disk when seeing and listening to the copied content.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a content recording/reproducing apparatus is a content recording apparatus which is connected with a permission server that permits recording of content through a network and records the content in a first recording medium, and the content recording/reproducing apparatus comprises: a reading module that reads content encrypted based on a first encryption scheme and binding information from a disposed second recording medium; a first decoding module that uses the binding information to decode the content that are encrypted based on the first encryption scheme and read by the reading module; a copy management module that authenticates permission of recording of the content by using the permission server; a second encrypting module that encrypts the content decoded by the first decoding module based on a second encryption scheme when it is determined that the copy management module permits recording of the content; a content recording module that records the content encrypted by the second encrypting module as copied content in the first recording medium; and a binding information storage module that stores the binding information in the first recording medium.

Embodiments of this invention will be described in detail with reference to the drawings.

First, a content recording/reproducing apparatus and a content recording/reproducing method according to a first embodiment of the present invention will be first explained in detail with reference to FIGS. 1 to 7.

Figure 1:
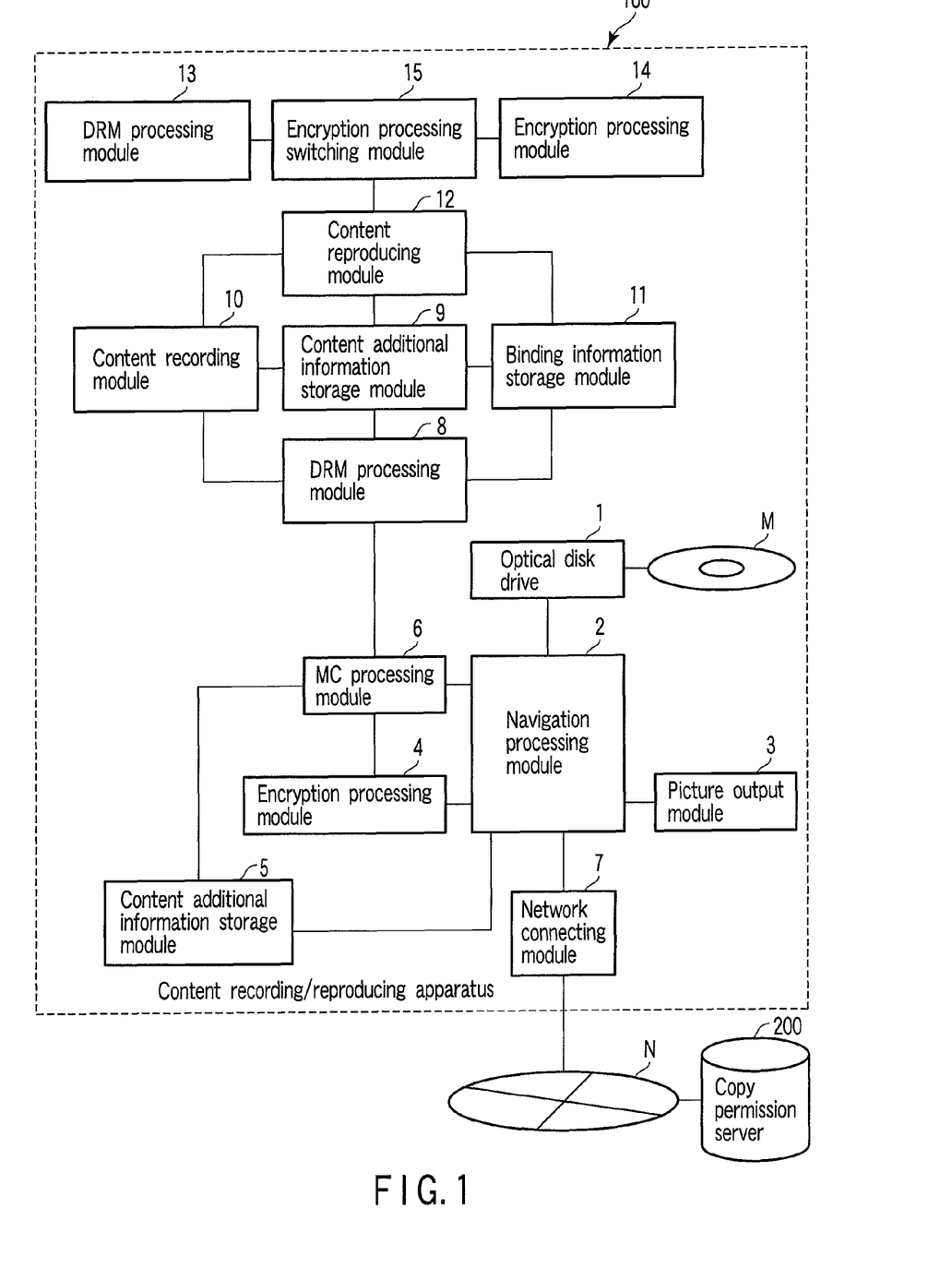
FIG. 1 is an exemplary block diagram showing a structure of a content recording/reproducing apparatus according to a first embodiment of the present invention.

FIG. 1 is a block diagram showing a structure of a content recording/reproducing apparatus 100 according to the first embodiment. The content recording/reproducing apparatus 100 performs recording and reproduction with respect to an optical disk, e.g., an HD-DVD, a DVD, and a BD. The content recording/reproducing apparatus 100 is a recording/reproducing apparatus compatible with the AACS. That is, the content recording/reproducing apparatus 100 can perform managed copy.

As shown in FIG. 1, the content recording/reproducing apparatus 100 is connected with a copy permission server 200 through a network N, e.g., the Internet. The copy permission server 200 is a server that is provided by, e.g., a provider of content. The copy permission server 200 authenticates the content recording/reproducing apparatus 100 when receiving a copy permission request from the content recording/reproducing apparatus 100. When authentication has succeeded, the copy permission server 200 transmits information indicating that managed copy is permitted to the content recording/reproducing apparatus 100.

The content recording/reproducing apparatus 100 comprises an optical disk drive 1, a navigation processing module 2, a picture output module 3, an encryption processing module 4, a content additional information storage module 5, an MC processing module 6, a network connecting module 7, a DRM processing module 8, a content additional information storage module 9, a content recording module 10, a binding information storage module 11, a content reproducing module 12, a DRM processing module 13, an encryption processing module 14, and an encryption processing switching module 15. The respective modules in the content recording/reproducing apparatus 100 are connected with each other through a general-purpose bus or a dedicated special bus.

The optical disk drive 1 is a reading module. The optical disk drive 1 reads data in the optical disk M. Further, when the optical disk M is a writable optical disk, the optical disk drive 1 can also write data into the optical disk M.

The optical disk M stores an AV stream as content information, various kinds of attribute information, a script, binding information, and others. The AV stream (content), the various kinds of attribute information, and the script stored in the optical disk M are encrypted based on an encryption scheme AACS. The binding information is stored in a physical region in the optical disk M that cannot be accessed by users.

Furthermore, the optical disk M stores a managed copy manifest (copy management information). This copy management information comprises a URL of the copy permission server 200 required for authentication for managed copy, a disk ID inherent to the optical disk M, and others.

The navigation processing module 2 manages reproduction of content in the optical disk M. That is, the navigation processing module 2 performs separation processing for multiplexed data, decoding of an audio/video stream, various kinds of script processing, and reproduction of content. The navigation processing module 2 processes the script in the optical disk M to execute various kinds of control.

The picture output module 3 is a picture output section. The picture output module 3 outputs a reproduction signal required to display a picture in a display device such as an externally connected display based on an output from the navigation processing module 2. The picture output module 3 may comprise a sound output section. The sound output section outputs a sound signal required to output sound to an output device such as an externally connected speaker based on an output from the navigation processing module 2.

The encryption processing module 4 is an encryption processing module (a decoding module). The encryption processing module 4 decodes encrypted data in the optical disk M. That is, a device key held by the content recording/reproducing apparatus 100 is used to decode the binding information in the optical disk M. The decoded binding information is used to decode (AACS decoding processing) data subjected to the AACS, e.g., the content, the script, and the attribute information.

The content additional information storage module 5 is a first content additional information storage module. The content additional information storage module 5 is a region where additional information of the content (e.g., pictures, sounds, still image data, or script data) utilized for reproduction of the content in the optical disk is stored.

The MC processing module 6 is an MC (Managed Copy) processing module. It controls managed copy of the content in the optical disk M. Upon accepting authentication concerning managed copy from the copy permission server 200, the MC processing module 6 copies content in the optical disk M.

The network connecting module 7 is a network connecting module. The network connecting module 7 has a network connecting function. The content recording/reproducing apparatus 100 performs communication with the copy permission server 200 on the network N through the network connecting module 7.

The DRM processing module 8 is a DRM processing module (an encrypting module). The DRM processing module 8 performs DRM (Digital Rights Management) with respect to the copied content when effecting managed copy. As a result, the content subjected to managed copy is protected from being further copied to be viewed. That is, the DRM processing module 8 performs DRM processing (DRM encryption processing), e.g., restricting copy of the copied content or restricting reproduction of the copied content to enable reproduction using specific hardware alone.

The copied content subjected to DRM encryption processing (the content and the content additional information) by the DRM processing module 8 are stored in the content additional information storage module 9 and the contentstorage module 10, respectively.

The content additional information storage module 9 is a second content additional information storage module. The content additional information storage module 9 stores the content additional information.

The content recording module 10 is a content recording module. The content recording module 10 is a storage region where the content copied from the optical disk M is stored. The content recording module 10 is formed of, e.g., an HDD or a nonvolatile memory.

The binding information storage module 11 is a binding information storage module. The binding information storage module 11 stores the binding information decoded by the encryption processing module 4.

The content reproducing module 12 is a content reproducing module. The content reproducing module 12 plays back the copied content based on the information stored in the content additional information storage module 9, the content recording module 10, and the binding information storage module 11.

The DRM processing module 13 is a DRM processing module. The DRM processing module 13 performs DRM decoding processing of decoding the content subjected to the DRM encryption processing.

The encryption processing module 14 is an encryption processing module (a decoding module). The encryption processing module 14 uses the binding information stored in the binding information storage module 11 to carry out AACS decoding processing.

When executing reproduction of the copied content, the content reproducing module 12 reads the content from the content recording module 10. Additionally, the content reproducing module 12 reads the content additional information from the content additional information storage module 9. The content reproducing module 12 plays back the copied content based on the read content and content additional information.

It is to be noted that the copied content stored in the content additional information storage module 9 and the content recording module 10 are subjected to the DRM encryption processing. Therefore the content reproducing module 12 performs the DRM decoding processing for the copied content by using the DRM processing module 13.

Additionally, when script processing of instructing download of network content by using the navigation processing module 2 is executed at the time of reproduction of the copied content, the navigation processing module 2 downloads the network content from the network. Here, the downloaded network content is subjected to the AACS encryption processing. Therefore, the content reproducing module 12 carries out the AACS decoding processing for the network content by using the encryption processing module 14.

The encryption processing switching module 15 is an encryption processing switching module. The encryption processing switching module 15 switches schemes of content decoding processing based on control of the content reproducing module 12. That is, when the content to be decoded is subjected to the DRM encryption processing, the encryption processing switching module 15 switches the decoding modules to effect decoding using the DRM processing module 13. Additionally, when the content to be decoded is subjected to the AACS encryption processing, the encryption processing switching module 15 switches the decoding modules to perform decoding using the encryption processing module 14.

When playing back the content in the optical disk M, the navigation processing module 2 reads data in the optical disk M by using the optical disk drive 1. Here, the navigation processing module 2 obtains an AV stream, meta data, a script, various kinds of management files, and others from the optical disk M.

The navigation processing module 2 carries out separation processing for the read data. Further, the navigation processing module 2 uses the encryption processing module 4 to perform the AACS decoding processing of the data encrypted based on the AACS.

Further, the navigation processing module 2 executes script processing to carry out display of a menu and others and various kinds of command processing. The thus generated content is displayed in an external display through the picture output module 3.

Furthermore, the navigation processing module 2 stores a data group required for an operation of content to the content additional information storage module 5. Moreover, the navigation processing module 2 can read the data group from the content additional information storage module 5 to be used for reproduction of the content when playing back the content.

The content additional information storage module 5 generally stores information, e.g., text data, picture data, sound data, still image data, script data, and a chapter position. The navigation processing module 2 accesses information stored in the content additional information storage module 5 based on script processing when executing the script processing.

Figure 2:
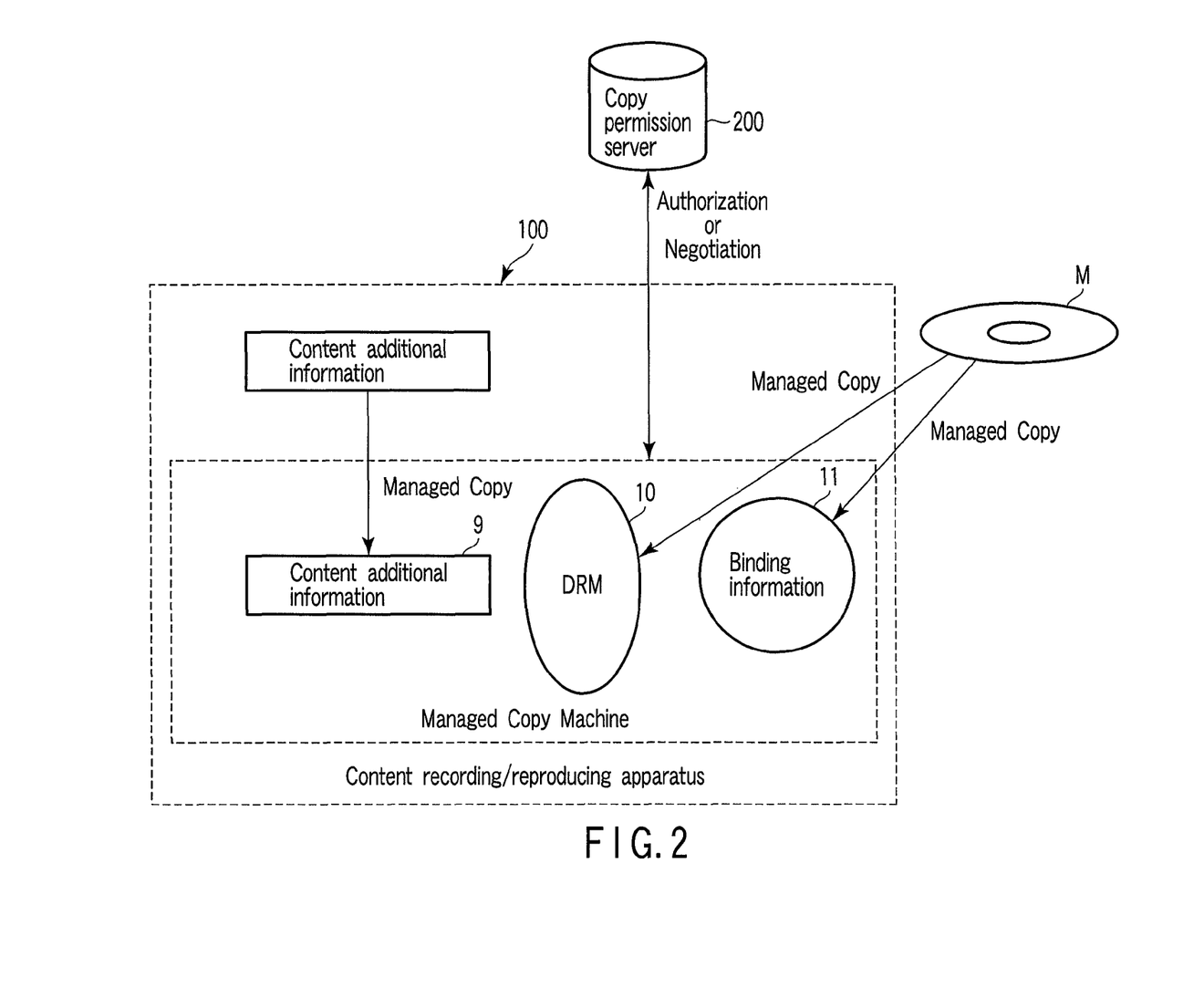
FIG. 2 is an exemplary explanatory view for schematically explaining an example of managed copy executed by the content recording/reproducing apparatus depicted in FIG. 1.

FIG. 2 is an explanatory view for schematically explaining an example of managed copy executed by the content recording/reproducing apparatus 100 depicted in FIG. 1. Further, FIG. 3 shows an sequence for explaining authentication processing of managed copy executed by the content recording/reproducing apparatus 100 and the copy permission server 200 depicted in FIG. 1.

As explained above, managed copy is a content copy scheme defined in the AACS standard. Various kinds of content are safely copied based on managed copy.

Specifically, managed copy is executed by using a script language in content in the optical disk M. That is, when the navigation processing module 2 depicted in FIG. 1 is used to execute this script, managed copy is performed.

Figure 3:
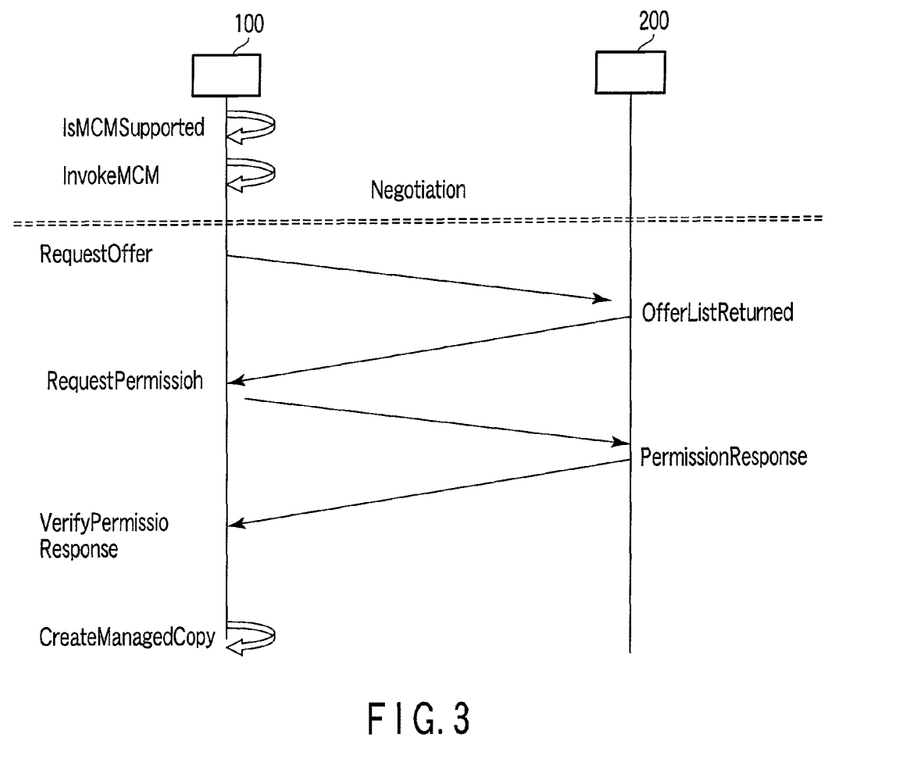
FIG. 3 is an exemplary explanatory view for explaining authentication processing of managed copy executed by the content recording/reproducing apparatus and a copy permission server depicted in FIG. 1.

As shown in FIG. 3, when carrying out managed copy, the navigation processing module 2 first confirms whether this apparatus 100 is compatible with managed copy. That is, the navigation processing module 2 confirms whether this apparatus 100 supports an MCM (Managed Copy Machine). The navigation processing module 2 calls an API (IsMCMSupported), and determines that this apparatus 100 supports the MCM when a return value of the API is "True".

When it is determined that this apparatus 100 supports the MCM, the navigation processing module 2 calls an API (InvokeMCM) to activate the MCM. That is, the navigation processing module 2 activates a module concerning execution of managed copy in the modules depicted in FIG. 1. It is to be noted that the MCM operates based on control of the navigation processing module 2.

The navigation processing module 2 reads the copy management information from the optical disk M. In this case, the navigation processing module 2 functions as a copy management module. The navigation processing module 2 reads a URL of the copy permission server 200 and a disk ID from the copy management information. The navigation processing module 2 accesses the copy permission server 200 via the network connecting module 7, and transmits a copy permission request (Request Offer) comprising the disk ID to the copy permission server 200 to perform negotiation.

When the copy permission server 200 receives the copy permission request from the content recording/reproducing apparatus 100, i.e., the MCM, it transmits a permission list of content that can be subjected to managed copy to the content recording/reproducing apparatus 100 as a response based on the received information (Offer List Returned).

Upon receiving the permission list, the navigation processing module 2 selects, e.g., content to be subjected to managed copy, a DRM scheme, and others in response to an operation by a user. The navigation processing module 2 transmits a copy permission request comprising the information selected here (Request Permission) to the copy permission server 200.

The copy permission server 200 authenticates managed copy based on the copy permission request. The copy permission server 200 transmits an authentication result (Permission Response) to the content recording/reproducing apparatus 100.

When the navigation processing module 2 authenticates validity of the received authentication result (Verify Permission Response) and determines that the authentication result is valid, it performs managed copy (Create Managed Copy). That is, the navigation processing module 2 executes managed copy by using the MC processing module 6 depicted in FIG. 1.

The MC processing module 6 reads the content and the content additional information encrypted based on the AACS and the binding information from the optical disk M by using the optical disk drive. The encryption processing module 4 depicted in FIG. 1 uses the binding information to perform AACS decoding processing with respect to the content and the content additional information. The MC processing module 6 transmits the content and the content additional information decoded into plain texts to the DRM processing module 8 depicted in FIG. 1.

The DRM processing module 8 carries out DRM encryption processing with respect to the content and the content additional information decoded into plain texts based on the DRM scheme authenticated by the copy permission server 200.

The MC processing module 6 stores the copied content (the content and the content additional information) subjected to the DRM encryption processing by the DRM processing module 8 in the content additional information storage module 9 and the contentstorage module 10 depicted in FIG. 1, respectively.

Furthermore, the MC processing module 6 stores the binding information read from the optical disk M in the binding information storage module 11 depicted in FIG. 1.

A plurality of binding methods are defined in the AACS.

Figure 4:
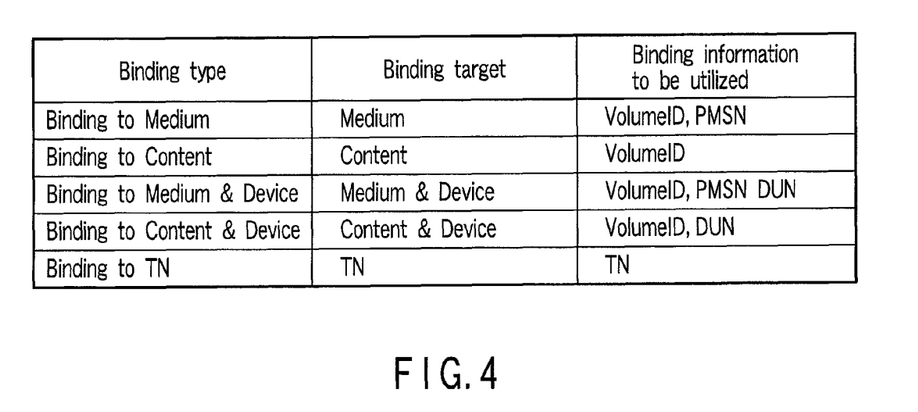
FIG. 4 is an exemplary explanatory view for explaining types of binding information.

FIG. 4 is an explanatory view for explaining types of binding information. As shown in FIG. 4, as the binding information, there are types, e.g., "Binding to Medium", "Binding to Content", "Binding to Medium and Device", "Binding to Content and Device", "Binding to TN", and others. As shown in FIG. 4, a binding target and binding information to be utilized are defined in accordance with each type of the binding information.

That is, a binding target of "Binding to Medium" is "Medium". "VolumeID, PMSN" is used as the binding information. A binding target of "Binding to Content" is "Content". "VolumeID" is used as the binding information. A binding target of "Binding to Medium and Device" is "Medium and Device". "VolumeID, PMSN, DUN" is used as the binding information. A binding target of "Binding to Content and Device" is "Content and Device". "VolumeID, DUN" is used as the binding information. A binding target of "Binding to TN" is "TN". "TN" is used as the binding information.

Various types of binding information that differ depending on each piece of content may be possibly used. Therefore, the binding information is stored in the binding information storage module 11 in accordance with each piece of content as shown in FIG. 5.

Figure 5:
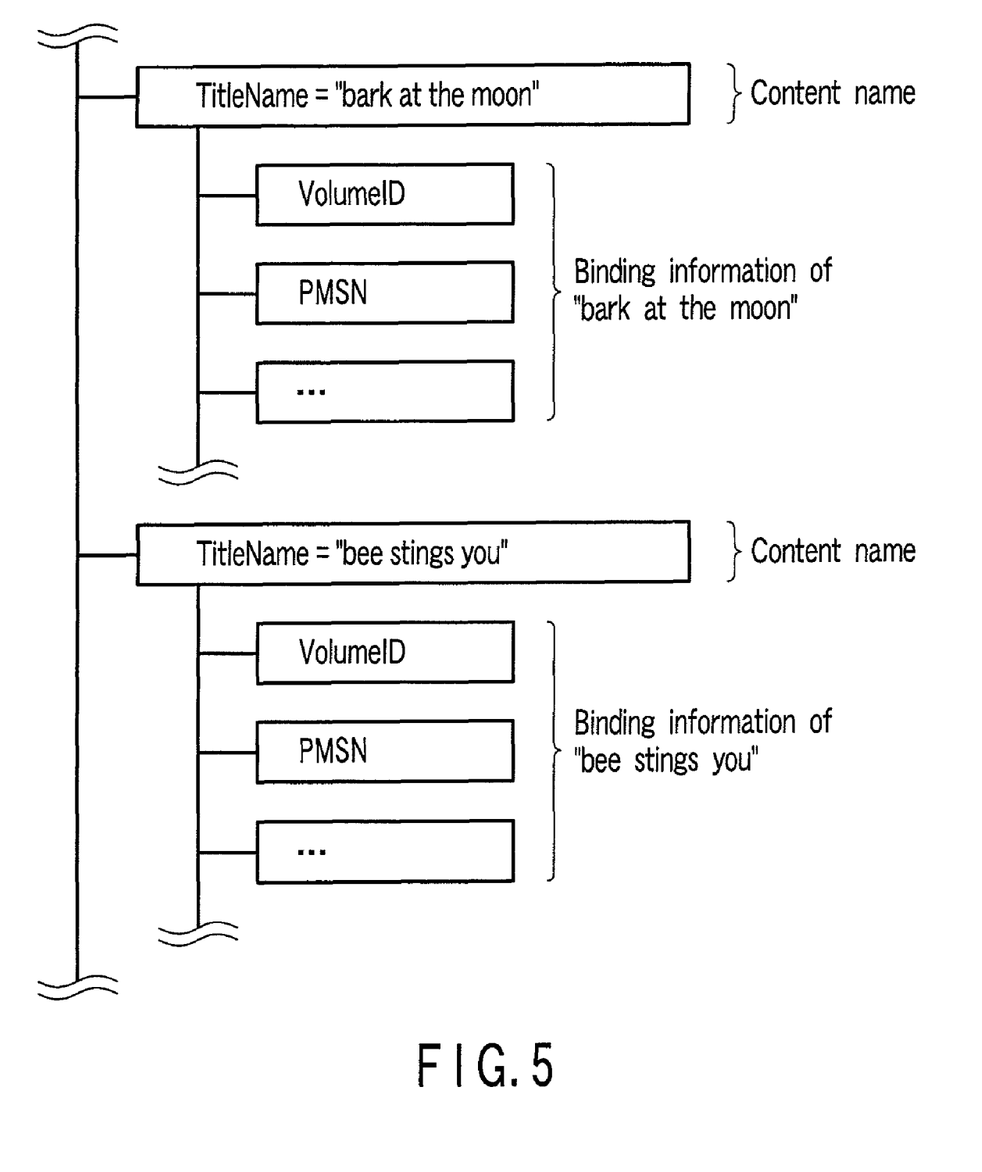
FIG. 5 is an exemplary explanatory view for explaining an example of binding information stored in a binding information storage module.

FIG. 5 is an explanatory view for explaining an example of binding information stored in the binding information storage module 11. As shown in FIG. 5, as binding information of a content name "Bark at the moon", "VolumeID" and "PMSN" are stored.

Furthermore, as binding information of a content name "bee sting you", "VolumeID" and "PMSN" are stored.

Although omitted in the drawing, other binding information is stored in accordance with each piece of content.

Figure 6:
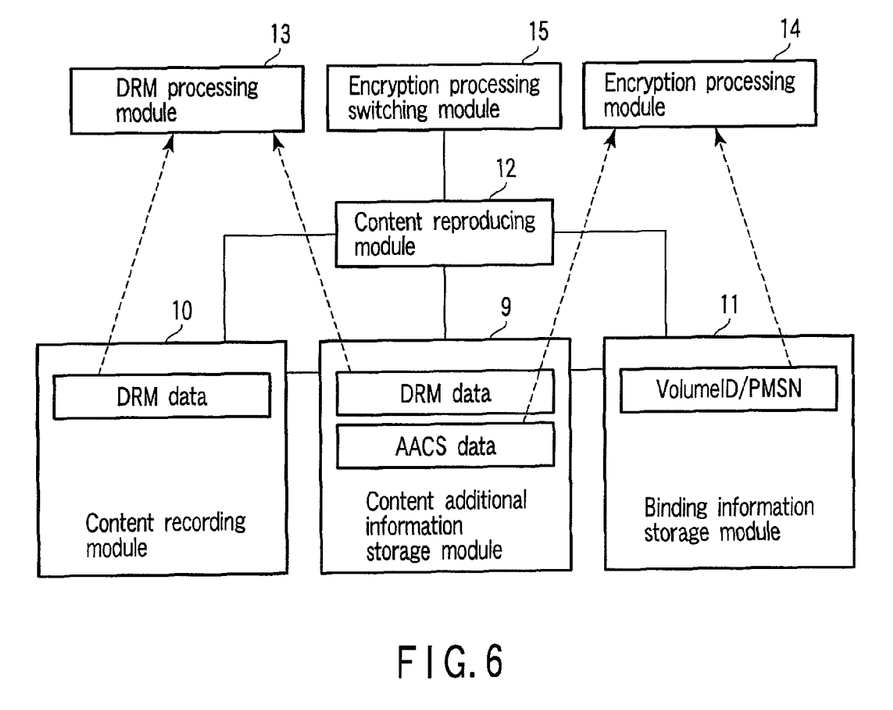
FIG. 6 is an exemplary explanatory view for explaining reproduction processing for copy content and network content.

FIG. 6 is an explanatory view for explaining reproduction processing for copied content and network content.

At the time of reproduction of copied content created based on managed copy, network access may occur in some cases. For example, the content recording/reproducing apparatus 100 downloads network content from the server and stores the network content in the content additional information storage module 9 depicted in FIG. 1 to play back the network content at the time of playing back the network content.

That is, this server stores data such as "Playlist", "application", "video object (VOB)", "AACS relevant information (Title Key File/Title Usage File)", and others.

The copied content recorded in the content recording module 10 is encrypted based on the DRM. Therefore, when playing back the copy content, the encryption processing switching module 15 selects the DRM processing module 13. That is, the content reproducing module 12 reads the copied content from the content recording module 10, and uses the DRM processing module 13 to execute the DRM decoding processing.

Here, it is assumed that a script of downloading data from the server to be played back is comprised in the copied content. In this case, the navigation processing module 2 accesses the server based on the script and downloads the data specified by the script. That is, the navigation processing module 2 functions as a script processing module.

Figure 7:
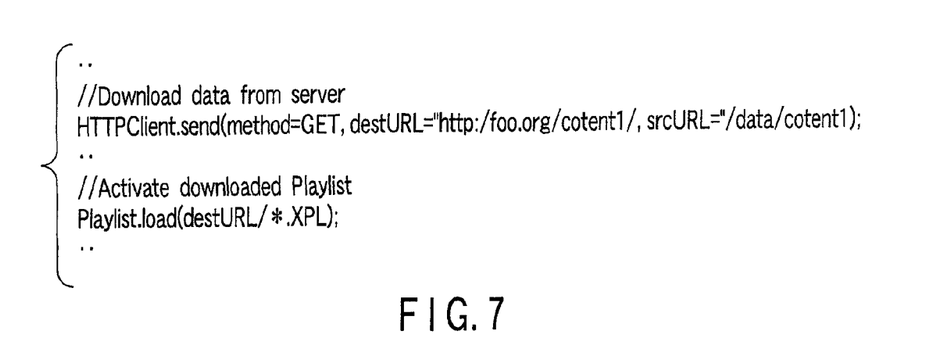
FIG. 7 is an exemplary explanatory view for explaining a description example of a script that instructs download and reproduction of the network content.

Here, when playing back the downloaded content, the navigation processing module 2 calls the downloaded data "Playlist". FIG. 7 shows a description example of the script required to execute such processing.

As shown in FIG. 7, the script required to download the data from the server comprises processing content, a URL of the server, a file name of the content, and others. Further, the script required to execute the downloaded data comprises processing content and a file name required to execute the processing.

The content (the network content) downloaded from the server here, i.e., "application" and "VOB" are usually encrypted based on the AACS. Therefore, when playing back the network content, the encryption processing switching module 15 selects the encryption processing module 14.

That is, the content reproducing module 12 reads the network content from the content additional information storage module 9. The content reproducing module 12 reads the binding information associated with the copied content that are currently in execution from the binding information storage module 11. The content reproducing module 12 uses the read binding information to execute AACS decoding processing by the encryption processing module 14. The content reproducing module 12 plays back the decoded network content.

It is to be noted that the binding information is stored in accordance with each piece of content (each piece of copied content). Therefore, even when the binding information storage module 11 stores a plurality of pieces of binding information, the content reproducing module 12 can readily select binding information associated with copied content that are currently in a reproduction process.

As explained above, when executing the managed copy, the content recording apparatus stores the content, the content additional information, and the binding information read from the optical disk. When playing back the network content obtained during reproduction of the copied content, the content recording apparatus uses the stored binding information to execute the AACS decoding processing, thereby playing back the network content.

As a result, the content recording apparatus according to this embodiment can provide a user with an audio-visual environment that does not differ depending on a case where content subjected to the managed copy are played back and a case where content from the optical disk are played back. As a result, it is possible to provide the content recording/reproducing apparatus and the content recording/reproducing method that can further improve conveniences of users.

It is to be noted that, when storing the binding information, the DRM processing module 8 may execute the DRM encryption processing with respect to the binding information. In this case, the content reproducing module 12 first executes the DRM decoding processing with respect to the binding information and uses the decoded binding information to perform the AACS decoding processing with respect to the network content.

A second embodiment will now be explained with reference to FIG. 8. It is to be noted that like reference numerals denote structures equal to those in the first embodiment, thereby omitting a detailed explanation thereof.

The description has been given as to the structure where the content recording/reproducing apparatus 100 according to the first embodiment executes the AACS decoding processing with respect to the network content to be played back by using the binding information copied at the time of execution of the managed copy when playing back the network content, but the present invention is not restricted thereto.

Network content associated with a plurality of encryption schemes may be stored on a server side in advance, and network content based on a decoding enabling encryption scheme by the content recording/reproducing apparatus may be downloaded.

This structure can be realized by, e.g., rereading a URL of a script by the content recording/reproducing apparatus 100 or executing processing of adding new information to an HTTP header.

Figure 8:
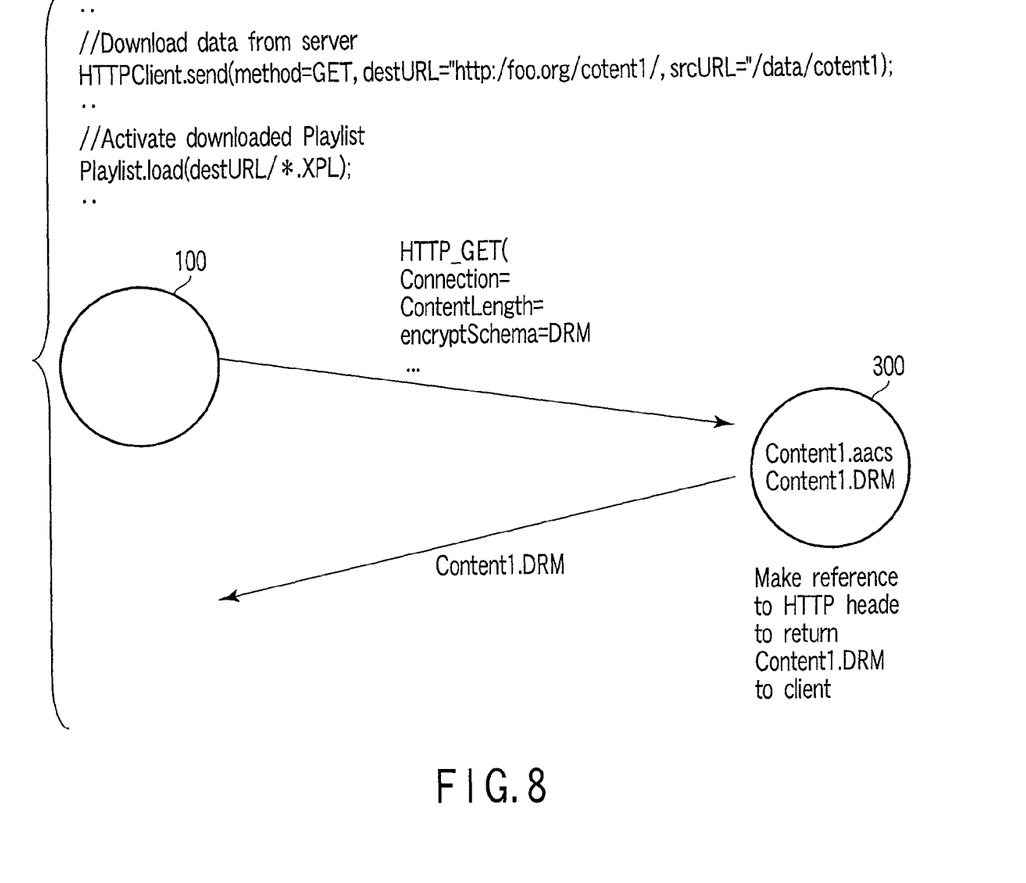
FIG. 8 is an exemplary explanatory view for explaining processing when downloading network content in a content recording/reproducing apparatus according to a second embodiment of the present invention.

FIG. 8 is an explanatory view for explaining processing of downloading network content.

As explained above, a server 300 that provides the content recording/reproducing apparatus 100 with network content stores network content associated with a plurality of encryption schemes. In this embodiment, the server 300 stores network content based on the DRM scheme and network content based on the AACS scheme.

When adding new information to an HTTP header, the content recording/reproducing apparatus 100 accesses the server 300 specified by a URL in a script to request downloading network content. At this time, the content recording/reproducing apparatus 100 inserts information indicative of an encryption scheme that can be decoded by itself into an extended region of a header of the download request, thereby generating an HTTP method. As a result, the content recording/reproducing apparatus 100 informs the server of a necessary data type.

In this embodiment, when playing back copied content, the content recording/reproducing apparatus 100 inserts "DRM" as information indicative of the decoding enabling encryption scheme. Moreover, when playing back content in an optical disk M, the content recording/reproducing apparatus 100 inserts "AACS" as information indicative of the decoding enabling encryption scheme.

The server 300 makes reference to the header of the received download request to determine the decoding enabling encryption scheme of the content recording/reproducing apparatus 100, and selects network content transmitted to the content recording/reproducing apparatus 100.

That is, when "DRM" is inserted as the information indicative of the decoding enabling encryption scheme, the server 300 transmits "Content1. DRM" encrypted based on the DRM to the content recording/reproducing apparatus 100. Additionally, when "AACS" is inserted as the information indicative of the decoding enabling encryption scheme is inserted, the server 300 transmits "Content1. aacs" encrypted based on the AACS to the content recording/reproducing apparatus 100.

With the above-explained structure, the content recording apparatus can provide a user with an audio-visual environment that does not vary depending on a case of playing back copied content generated based on managed copy and a case of playing back content from the optical disk. As a result, it is possible to provide a content recording/reproducing apparatus and a content recording/reproducing method that can further improve convenience of users.

As explained above, according to the first embodiment, it is possible to see and listen to network content even when playing back copied content. However, information stored in the content additional information storage module 5 or 9 is sequentially rewritten. For example, a position of a chapter inserted by a user's operation or a position where reproduction of content is ended is rewritten in the content additional information storage module 5 or 9.

As a result, when both copied content and content in the optical disk M are possibly viewed, there is a problem that content additional information varies between the content additional information storage module 5 and the content additional information storage module 9. Therefore, convenience of users may be possibly degraded.

Therefore, an explanation will be given as to an example of achieving the consistency of content additional information in the content additional information storage module 5 and the content additional information storage module 9 in a third embodiment.

The third embodiment will be explained with reference to FIGS. 9 to 13. It is to be noted that like reference numerals denote structures equal to those in the first embodiment, thereby omitting a detailed explanation thereof.

Figure 9:
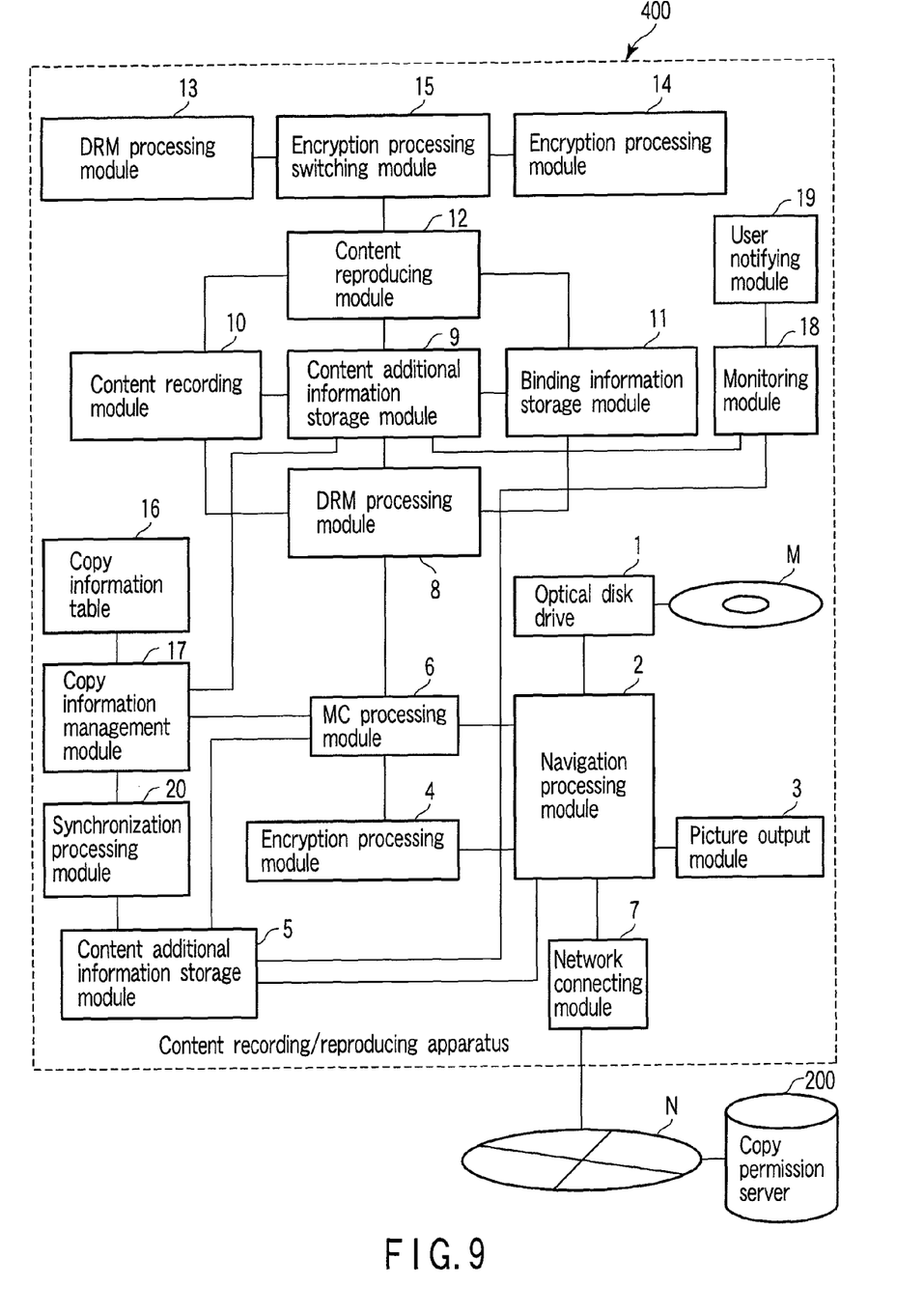
FIG. 9 is an exemplary diagram showing a structural example of a content recording/reproducing apparatus according to a third embodiment of the present invention.

FIG. 9 is a view showing a structural example of a content recording/reproducing apparatus 400 according to the third embodiment.

As shown in FIG. 9, the content recording/reproducing apparatus 400 according to the third embodiment comprises an optical disk drive 1, a navigation processing module, a picture output module 3, an encryption processing module 4, a content additional information storage module 5, an MC processing module 6, a network connecting module 7, a DRM processing module 8, a content additional information storage module 9, a contentstorage module 10, a binding information storage module 11, a content reproducing module 12, a DRM processing module 13, an encryption processing module 14, an encryption processing switching module 15, a copy information table 16, a copy information management module 17, a monitoring module 18, a user informing module 19, and a synchronization processing module 20. The respective modules in the content recording/reproducing apparatus 400 are connected with each other through a general-purpose bus or a dedicated special bus.

The copy information table 16 is a copy information table storage module. The copy information table 16 stores information concerning copy when managed copy is carried out.

The copy information management module 17 is a copy information management module. The copy information management module 17 controls writing information into the copy information table 16.

The monitoring module 18 is a monitoring module. The monitoring module 18 judges whether stored content in the content additional information storage module 5 or the content additional information storage module 9 are updated.

The user informing module 19 is a user informing module. The user informing module 19 creates and outputs display data in order to provide a user with information when an event that is to be reported to the user occurs in the apparatus 400.

The synchronization processing module 20 is a synchronizing module. The synchronization processing module 20 synchronizes content additional information.

Figure 10:
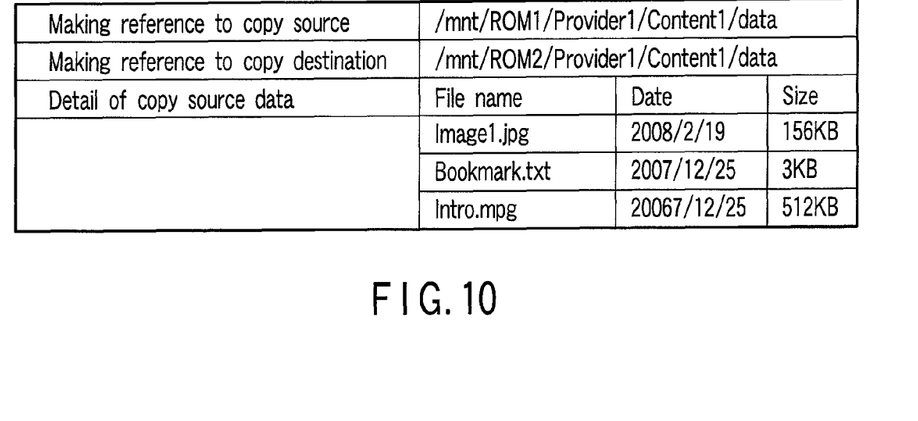
FIG. 10 is an exemplary diagram showing a storage example of a copy information table depicted in FIG. 9.

When performing managed copy, content additional information in the content additional information storage module 5 is copied to the content additional information storage module 9. In this case, the copy information management module 17 records relevant information concerning copy in the copy information table 16. This relevant information is, e.g., reference information of copy source, reference information of a copy destination, a list of copied data, or attribute information such as a date that copy is performed. As a result, such information as depicted in FIG. 10 is recorded in the copy information table 16.

Figure 11:
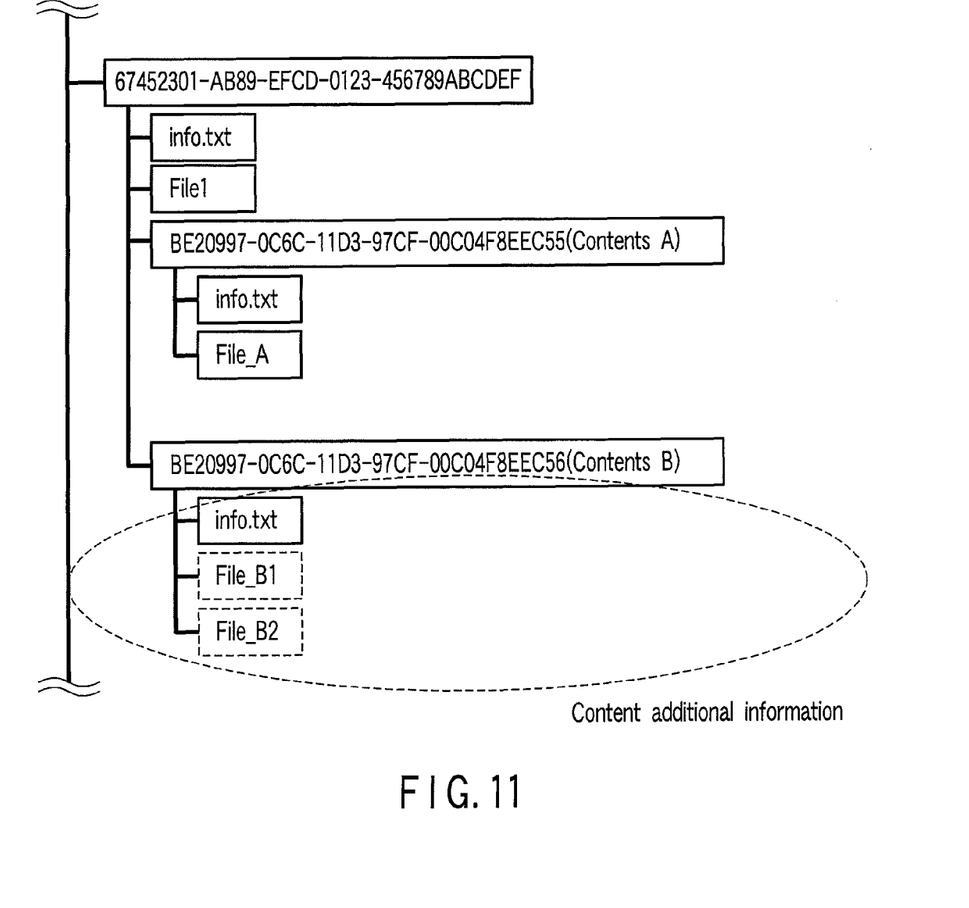
FIG. 11 is an exemplary diagram showing an example of content additional information stored in content additional information storage module.

When playing back copied content, the content recording/reproducing apparatus 400 utilizes the content additional information storage module 5 as a storage position for content information. Further, when playing back content in an optical disk M, the content recording/reproducing apparatus 400 utilizes the content additional information storage module 9 as a storage position for content information. FIG. 11 is a view showing an example of content additional information stored in the content additional information storage module 5 or the content additional information storage module 9.

When content additional information is newly downloaded from the server, a bookmark (a chapter) of content is changed, or an image of content is captured after execution of managed copy and during reproduction of content in the optical disk M, content in the content additional information storage module 5 is updated.

The monitoring module 18 constantly compares content in the content additional information storage module 5 with those in the content additional information storage module 9. That is, when content in the content additional information storage module 5 or the content additional information storage module 9 are updated, the monitoring module 18 detects updating. When the monitoring module 18 detects updating, it informs a user of updating of the content additional information by using the user informing module 19.

Figure 12:
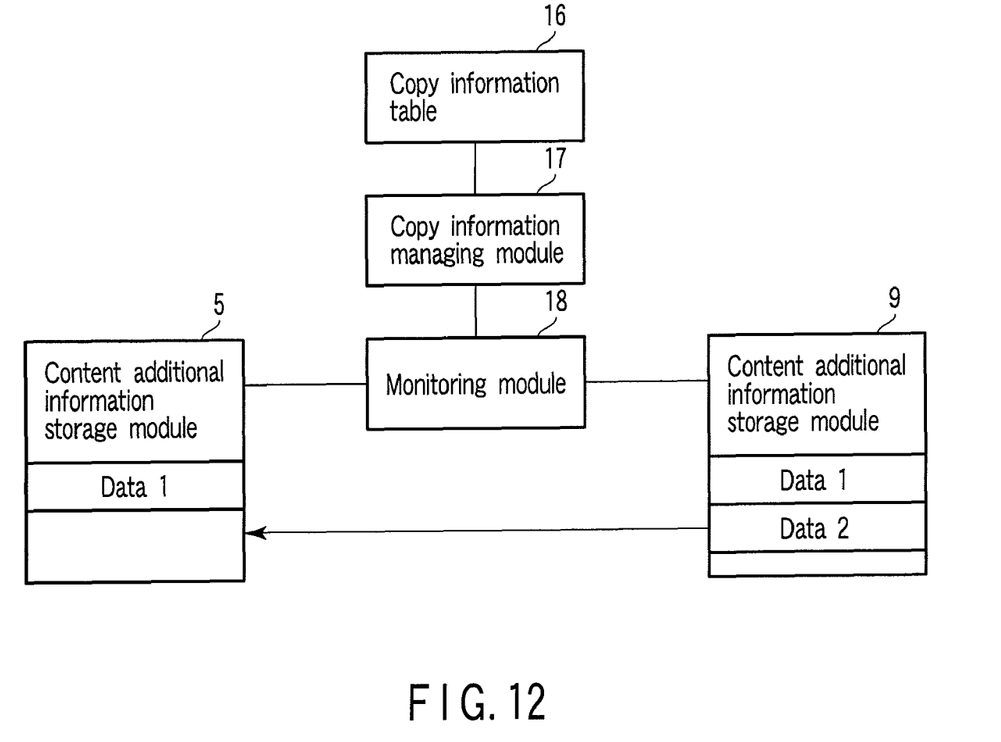
FIG. 12 is an exemplary explanatory view for explaining synchronization processing executed by the content recording/reproducing apparatus depicted in FIG. 9.

Furthermore, when achieving synchronization of content additional information is set by a user's operation, the synchronization processing module 20 executes synchronization processing of achieving synchronization of stored content in the content additional information storage module 5 and those in the content additional information storage module 9. That is, the synchronization processing module 20 copies updated information in such a manner that content in the content additional information storage module 5 coincide with those in the content additional information storage module 9 as shown in FIG. 12.

There are a plurality of methods as the synchronization processing. For example, when added data is subjected to the AACS, the data must be decoded. Therefore, the content recording/reproducing apparatus 400 uses binding information stored in the binding information storage module 11 to perform decoding or reads the binding information by again reading the optical disk M to perform decoding.

When the added data is not subjected to the AACS, the synchronization processing module 20 can copy the added data to the other content additional information storage module as it is.

When copy of content additional information, i.e., synchronization processing is executed, the copy information management module 17 updates information in the copy information table.

As explained above, the content recording/reproducing apparatus detects updating in the plurality of content additional information storage modules, and copies updated data to the other content additional information storage module when updating is detected. As a result, even when a user views and listens to either the optical disk or the copied content, it is possible to provide the user with the same audio-visual environment. Consequently, the content recording/reproducing apparatus and the content recording/reproducing method that can further improve convenience of users can be provided.

It is to be noted that the description has been given as to the example where content in the optical disk subjected to the AACS and copied content subjected to the DRM are played back by using the content recording apparatus in this embodiment, but the present invention is not restricted thereto. For example, copied content may be played back by using a reproduction apparatus such as a portable device and, when updating is detected in a content additional information storage module in the portable device or a content additional information storage module in the content recording apparatus, updated content additional information may be copied to the content additional information storage module in the other device or apparatus.

It is to be noted that the present invention is not restricted to the foregoing embodiments, and it can be realized by modifying constituent elements without departing from the scope of the invention on an embodying stage. Further, appropriately combining a plurality of constituent elements disclosed in the foregoing embodiments enables forming various kinds of inventions. For example, several constituent elements may be deleted from all the constituent elements disclosed in the embodiments. Furthermore, the constituent elements in different embodiments may be appropriately combined.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A content recording apparatus configured to record content in a first recording medium comprising:
   a reading module configured to read content and additional content information encrypted based on a first encryption scheme, and binding information for decrypting the content encrypted based on the first encryption scheme, from a second recording medium which is portable;

a first additional content information storage module configured to store the additional content information read by the reading module;

a first decryption module configured to use the binding information in order to decrypt the content encrypted based on the first encryption scheme and read by the reading module;

a copy manager configured to authenticate with a permission server in order to confirm whether it is possible to copy the content;

an encrypting module configured to encrypt the content decrypted by the first decoder, and the additional content information, based on a second encryption scheme when recording of the content is permitted by the copy manager;

a content recorder configured to record the content encrypted by the second encrypting module as copied content in the first recording medium;

a second additional content information storage module configured to record the additional content information encrypted by the encrypting module in the first recording medium;

a first additional content information updater configured to update the additional content information in the first additional content information storage module while playing back the content recorded in the second recording medium;

a second additional content information updater configured to update the additional content information in the second additional content information storage module while playing back the copied content recorded in the first recording medium;

a monitor configured to detect that either the first additional content information updater or the second additional content information updater is updating; and a synchronizing module configured to update either the first additional content information updater or the second additional content information updater, whichever has not been updated with the updated additional content information when the monitor detects that updating by either the first additional content information updater or the second additional content information updater has been completed.

* * * * *